United States Patent
Sodani et al.

(10) Patent No.: US 7,529,913 B2
(45) Date of Patent: May 5, 2009

(54) LATE ALLOCATION OF REGISTERS

(75) Inventors: Avinash Sodani, Portland, OR (US); Per H. Hammarlund, Hillsboro, OR (US); Stephan J. Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 10/743,065

(22) Filed: Dec. 23, 2003

(65) Prior Publication Data

US 2005/0138334 A1   Jun. 23, 2005

(51) Int. Cl.
*G06F 9/30* (2006.01)

(52) U.S. Cl. ............................. 712/218; 712/219

(58) Field of Classification Search .................. 712/218, 712/219
See application file for complete search history.

(56) References Cited

U.S. PATENT DOCUMENTS

| | | | | |
|---|---|---|---|---|
| 5,740,414 A | * | 4/1998 | Tovey et al. ................. | 712/233 |
| 6,122,656 A | * | 9/2000 | Witt ........................... | 718/100 |
| 6,163,838 A | * | 12/2000 | Merchant et al. ............ | 712/219 |
| 6,298,435 B1 | * | 10/2001 | Chan et al. .................. | 712/217 |
| 6,405,304 B1 | * | 6/2002 | Farrell et al. ................ | 712/216 |
| 6,430,666 B1 | * | 8/2002 | Roth ........................... | 711/202 |
| 6,446,194 B1 | * | 9/2002 | Eisen et al. ................. | 712/216 |
| 7,007,271 B2 | * | 2/2006 | Kumar et al. ............... | 717/151 |
| 2002/0144090 A1 | * | 10/2002 | Ronen et al. ............... | 712/217 |

OTHER PUBLICATIONS

A. Gonzalez, J. Gonzalez, M. Valero, "Virtual-Physical Registers," hpca, p. 175, The Fourth International Symposium on High-Performance Computer Architecture, 1998.*

Teresa Monreal, Victor Vinals, Antonio Gonzalez, Mateo Valero, Jose Gonzalez, "Delaying Physical Register Allocation through Virtual-Physical Registers," micro, p. 186, 32nd Annual International Symposium on Microarchitecture, 1999.*

* cited by examiner

*Primary Examiner*—Eddie P Chan
*Assistant Examiner*—Jacob Petranek
(74) *Attorney, Agent, or Firm*—Kenyon & Kenyon LLP

(57) ABSTRACT

Embodiments of the present invention relate to a method and system for providing virtual identifiers corresponding to physical registers in a computer processor. According to the embodiments, the virtual identifiers may be used to represent the physical registers during operations in a pipeline of the processor.

19 Claims, 5 Drawing Sheets

LATE ALLOCATION OF REGISTERS

BACKGROUND

Speculative processing in computers is a known technique that involves attempting to predict the future course of an executing program in order to speed its execution. The predictions may or may not be correct, but when they are correct, dependencies of a given program may be resolved more quickly, and needed resources made available to the program more quickly, than might be the case absent the speculative processing. As a result, the program may execute more quickly.

Computer processors are becoming increasingly speculative, meaning that an effort is made to predict increasingly far into the future. How far ahead prediction is attempted may be referred to as the "depth" of the speculation; thus, attempting to predict far into the future may be referred to as "deep speculation." Speculative processing requires storage to hold speculatively-generated results. The deeper a computer speculates, the more storage may be needed to hold speculation-generated results.

The storage for speculative processing may be provided by a computer's physical registers, also referred to as the "register file." Thus, one approach to better accommodating increasingly deep speculative processing could be to make the register file bigger. However, this approach would have associated penalties in terms of, among other things, increased access latency, power consumption and silicon area required.

DETAILED DESCRIPTION

Figure 1:
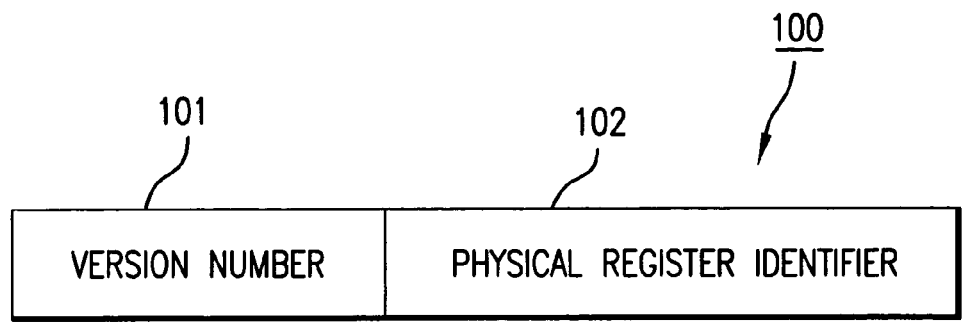
FIG. 1 shows a virtual identifier according to embodiments of the present invention.

Embodiments of the present invention relate to allocating registers in a computer in a way that increases the apparent number of registers available for processing without increasing the actual physical size of the register file. This may allow for deeper speculative processing without incurring the associated costs of a larger physical register file. Further, the embodiments relate to delaying physical register allocation until a processing stage when the physical register is actually needed, which may allow speculative processing to go forward without actually allocating scarce physical registers. This in turn may enable what are termed "disruptive events" in speculative processing to be discovered early, and for the appropriate corrective measures to be accordingly taken. Speculative processing may in this way be performed more efficiently.

Advantages provided by the embodiments are made possible at least in part by the fact that a physical register into which the results of an operation are to be written (hereinafter, the "write-back" register) does not need to be allocated until the results actually are available and need to be written. Notwithstanding, in conventional computer systems, an attempt may be made to allocate the write-back register well in advance of the time when it is actually needed to write a result. This ties down the write-back register for a much longer period than may be necessary and significantly reduces the number of free registers available for writing at any given time. This may result in significant processing delay if, for example, no register is available for writing and operations have to wait for registers to become free before entering the processing pipeline. This in turn may delay the discovery of disruptive events whose associated processes take a comparatively long time to complete (that is, events sometimes referred to as "long-latency disruptive events," such as branch mis-speculation and cache misses) and hence reduce the effectiveness of speculation. Accordingly, embodiments of the present invention relate to delaying the attempt to allocate the write-back register until it is actually needed, while otherwise allowing processing to go forward. This allows operations to enter the processing pipeline and to execute even when registers may not be available for writing, enabling early discovery—and thereby early resolution—of the long latency disruptive events.

A typical processing pipeline in a computer may comprise at least the stages of: fetch, rename, allocate, execute, write-back and retirement. In the fetch stage, an instruction may be fetched from an instruction cache. In the rename stage, logical registers of the instruction may be mapped to the physical registers that will actually be used to perform the operations called for by the instruction. A "logical" register means a representation of a physical register in terms of a processor's instruction set; a logical register may also be referred to as an "architectural" register. By "mapping" it is meant that a correspondence between the logical register and the physical register is defined. A known structure typically referred to as a "register alias table" may be used to hold logical-to-physical register mappings that are read or written in the rename stage.

An instruction typically specifies "source" logical registers and a "destination" logical register. The source logical registers represent registers from which values to be operated on are to be read, and the destination logical register represents a register to which the result of the operation is to be written. In the allocate stage, an attempt may be made to allocate a physical write-back register for the instruction's destination logical register. If the attempt succeeds, the instruction may go on to the execute, write-back and retirement stages (in which stages, respectively, the instruction executes, writes a result to the write-back register, and exits the pipeline). In known computer systems, a lack of available write-back registers may cause an instruction to "stall" at the allocate stage, meaning that the instruction may not proceed any further down the pipeline until a write-back register becomes available. However, in view of the above discussion, this stall may be unnecessary, because the write-back register is not actually needed until the write-back stage.

One reason instructions are caused to stall if they are unable to allocate a write-back register is that there are typically dependencies among instructions in a pipeline that need to be resolved in order for processing to go forward. For example, some instructions may have, as their source logical registers, the destination logical registers of instructions earlier in the pipeline. In order to resolve the dependencies, it may be necessary to establish within the pipeline what register or registers an instruction will be writing to so that instructions dependent on it can know what registers to read their sources from. However, it is possible to satisfy the requirement of handling the inter-dependency between the instructions without actually having a physical write-back register available, by allocating the write-back register in logical or symbolic terms. That is, some allocation of a write-back register to an instruction, even if the register is merely symbolic, will be enough to connect the source and corresponding dependent instructions and will suffice to allow an instruction to proceed beyond the allocate stage and execute. The need to provide a "real" register for writing may therefore be delayed.

Accordingly, in embodiments of the present invention, virtual identifiers may be assigned to physical registers, and the virtual identifiers may be provided for mapping to physical registers at the rename stage as temporary substitutes for actual physical registers. These virtual identifiers may be allocated by instructions at the allocate stage, allowing the instructions to proceed beyond the allocate stage and execute, without actually needing to allocate physical registers. This may allow long-latency disruptive events in speculative processing, such as cache misses and branch mispredictions, to be discovered early and for appropriate corrective measures to be taken, enabling more efficient speculative processing.

A plurality of virtual identifiers may be assigned to each register in the physical register file, expanding the apparent number of available registers without actually increasing the size of the register file. The virtual identifiers may serve for purposes of resolving dependencies between instructions at the allocate stage in a pipeline, letting processing go forward beyond the allocate stage until a physical register is actually needed for write-back. At that time, a physical register may be provided for write-back using an authorization mechanism involving a register version table according to embodiments of the invention, described in more detail further on.

FIG. 1 shows one possible format of a virtual identifier. Each virtual identifier 100 may comprise a version number 101 and a physical register identifier 102. A plurality of virtual identifiers, each having a different version number but the same physical register identifier, may be assigned to the physical register identified by the physical register identifier. For example, referring to FIG. 2, assume that a physical register file 200 of a computer has 512 physical registers. By assigning, for example, four virtual identifiers, each having a different version number, to each physical register, a virtual identifier space 201 of 2048 virtual identifiers may be created. For example, physical register 1 (ref. no. 200.1) has 4 corresponding virtual identifiers 201.1, that is, versions 1-4; physical register 2 (ref. no. 200.2) has four corresponding virtual identifiers 201.2, that is, versions 1-4; and so on. The number of virtual identifiers that could be assigned per physical register is arbitrary and not limited to four.

According to embodiments, when an instruction in a processing pipeline passes through the rename stage, a virtual identifier may be mapped to the instruction's destination logical register as its write-back register and allocated to the instruction. This may allow the instruction to proceed to the execute stage and execute, without actually allocating the physical register identified in the virtual identifier. After the instruction executes and needs to write a result, it may be determined whether the physical register identified in the virtual identifier is available to be written to. This determination may depend on the version number of the virtual identifier. More specifically, the version number of the virtual identifier may be compared with a version number in a corresponding entry in the register version table.

When an instruction's destination logical register is mapped to a virtual identifier in the register alias table at the rename stage, a list of available virtual identifiers according to embodiments of the invention may be consulted to obtain a virtual identifier. The available-virtual-identifier list may contain an entry corresponding to each physical register, where each entry identifies the version number of the next available virtual identifier for that physical register. Before the new mapping for the destination logical register is written into the register alias table, the virtual identifier corresponding to the physical register that was previously mapped to the destination logical register may be read out from the register alias table and written into the available-virtual-identifier list with a new version number. This writing into the available-virtual-identifier list makes the new version of the virtual identifier corresponding to the physical register available for re-allocation to other instructions. Thus, the available-virtual-identifier list may be updated by adding thereto, upon mapping an instruction at the rename stage, the virtual identifier that is created by updating (e.g., incrementing) the version of the virtual identifier corresponding to the physical register that was previously mapped to the instruction's destination logical register.

Available-version counters according to embodiments of the invention may be provided in association with the available-virtual-identifier list. The available-version counters may track the number of available virtual identifiers per physical register. The counters may be decremented when corresponding virtual identifiers are allocated to instructions, and incremented when instructions retire. When allocating a virtual identifier from the available-virtual-identifier list, a corresponding available-version counter may first be checked to determine whether there are any available virtual identifiers for the corresponding physical register.

It should be noted that since, according to embodiments, there may be a finite number of virtual identifiers per physical register, the version numbers of the virtual identifiers in the available-virtual-identifier list may change in a cyclic fashion. Thus, using the example of virtual identifiers with four versions per physical register as described above, the version numbers in the available-virtual-identifier-list may start at 1, and then as virtual identifiers are mapped to logical registers and allocated, be incremented to 2, then 3, then 4, then start over at 1 again. As a further example, let the notation "v.r" represent a virtual identifier, where "v" stands for version number and "r" stands for physical register identifier. Further, suppose an available-virtual-identifier list entry corresponding to physical register 5 shows a version number of 3, and that the corresponding available-version counter has a value of 3. This would indicate that virtual identifiers 3.5, 4.5, and 1.5 are available.

Moving now to a more detailed description of operations associated with the register version table, the register version table may contain an entry corresponding to each physical register in the register file. Each entry may store a virtual identifier for the corresponding physical register, and therefore have a version number associated with it. The version numbers of the register version table entries may cycle periodically through the range of versions assigned to each register, based on operations described in more detail further on, but at a given time, the version number in a register version table entry may indicate when a given instruction is authorized to write to the corresponding physical register.

That is, if the version number of the virtual identifier allocated to the instruction attempting to write a result matches the version number of the corresponding entry in the register version table, the instruction may be permitted to write its result to the physical register identified in the virtual identifier. Otherwise, the instruction may be caused to wait and replay (re-execute), possibly a number of times, until the version number of the corresponding register version table entry cycles up or down, in the course of ongoing processing, to match the version number of the instruction's virtual identifier. Improved speculative processing may be promoted by the foregoing operations, as mentioned earlier, because even though the instruction may not complete in that it writes a result and retires, the outcome of its execution may be determined, which helps to detect disruptive events early.

The register version table may be updated, allowing new instructions to write their results to physical registers, when instructions retire. When an instruction retires, the physical register corresponding to the virtual identifier that was previously mapped to the instruction's destination logical register (i.e., the virtual identifier that was read from the register alias table at the rename stage) can be written to. This is because all instructions that needed to read the contents of the physical register corresponding to the previously-mapped virtual identifier are older than the retiring instruction and hence must have already retired. Thus, when an instruction retires, the version number of the entry in the register version table corresponding to the previously-mapped virtual identifier may be updated (e.g., incremented), allowing a new instruction to write to the corresponding physical register. Note that new versions of virtual identifiers placed in the available-version-identifier list at rename may be allocated by new instructions. These new instructions may have executed, but may be waiting to write back their results. Updating the versions of the corresponding entries in the register version table will allow these instructions to write back their results and retire from the pipeline. Also at instruction retirement, the available-version counter corresponding to the previously-mapped virtual identifier of the retiring instruction may be incremented. This indicates that another version of the virtual identifier is now free and available for re-allocation.

By way of illustration, consider the following example: assume a first instruction, I1, has logical register A as its destination register, and that virtual identifier 1.1 (version 1 of physical register 1) is allocated to logical register A. Further assume that a second instruction I2, later than I1 in the pipeline, also has logical register A as its destination register. According to embodiments of the invention, when I2 is in the rename stage and logical register A is mapped and allocated, logical register A's previous mapping, 1.1, may be read from the register alias table, and retained as I2 progresses through the pipeline. After I2 passes through the rename stage, a virtual identifier corresponding to physical register 1 (in this example, 2.1—the "next version" of the previous mapping) may be returned to the available-virtual-identifier list. A new instruction, I3, can be allocated this updated virtual identifier, 2.1. Instruction I3 may pass through the rename stage and proceed down the pipeline and execute. However, I3 may not be permitted to write its result into physical register 1 until the version of its allocated virtual identifier (2.1) is set to 2 in the register version table. The version in the register version table may be set to 2 when I2 retires. When I2 retires, the version in the register version table of the virtual identifier that was previously mapped to destination register A (1.1) is set to 2.1. Since by the time I2 retires, it is guaranteed that any instruction needing to read the result of instruction I1 (stored in physical register 1) has already done so, the contents of physical register 1 may be overwritten with new data. This is so because retirement is strictly sequential, and therefore any instruction later than I1 but earlier than I2, and needing to read I1's destination register, has already done so and retired by the time I2 retires. Thus at this time, I3, a new instruction allocated the same physical register as I1, but with a different version, may write its result in physical register 1.

The foregoing operations maintain a balance between register supply and demand, since every instruction that allocates a virtual identifier is paired with an instruction that returns a new version of that virtual identifier to the available list (e.g., I3 is paired with I2 for demand and supply, respectively, for the version 2 of physical register 1). Note that if allocation of registers according to embodiments of the present invention were not performed, then instruction I3 would be stalled at rename until I2 retires. This may be a significantly long delay. By adding versions to physical registers the oldest writer of a physical register can be tracked, and the younger writers can be prevented from writing back. This allows (returning to the earlier example) instruction I3 to proceed past rename (not be stalled there) and execute (but not write back). This early execution allows the discovery of disruptive, long latency events like branch misprediction and cache misses early, thereby, allowing corrective measures to be taken sooner.

Figure 2:
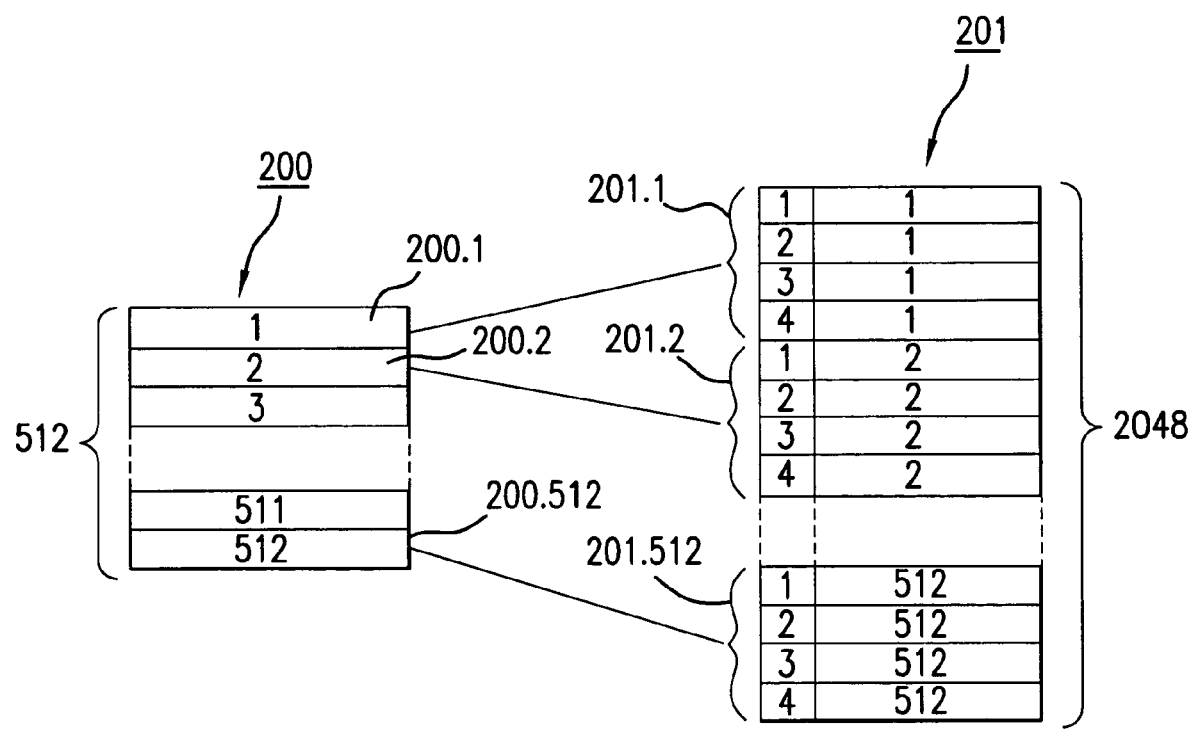
FIG. 2 shows an assignment of virtual identifiers to physical registers according to embodiments of the present invention.

The following is another example further illustrating operations of the present invention according to embodiments. Assume a physical register file allowing for 512 entries as shown in FIG. 2, each entry having four possible different virtual identifiers assignable to it. In other words, each physical register has four different possible virtual versions.

An instruction, instruction I, is fetched and enters the execution pipeline of a processor configured according to embodiments of the invention. Assume that instruction I is: A+B=C; i.e., "read the contents of logical registers A and B, add them together, and place the result in logical register C"; thus, logical register C is the destination register of instruction I. At the rename stage, a virtual identifier, if available, may be mapped to destination register C in the register alias table, and the register alias table may be read in order to determine what virtual identifier was previously mapped to destination register C. Assume the available-virtual-identifier list and available-version counters are consulted, and it is determined that virtual identifier 1.10, corresponding to physical register 10 and version number 1, is available, and is mapped to logical register C in the register alias table and allocated to instruction I. Further, assume in this example that logical register C had previously been mapped to virtual identifier 3.8; that is, physical register 8, version number 3. This previously-mapped virtual identifier may be returned to the available-virtual-identifier list after incrementing its version number; thus, in this case version 4 of physical register 8 (4.8) will be returned to the available-virtual-identifier list. Instruction I may then be scheduled for execution.

Assume that instruction I is then ready to execute, for example, because all of its predecessor instructions have executed and written their results to the physical register file; thus the values of A and B are now available to be read from physical registers. Accordingly, instruction I may be executed, and a result generated. It may then be determined from the register version table whether instruction I is permitted to write the result to the physical register corresponding to the virtual identifier assigned to logical register C, by checking the version number of the entry for the corresponding physical register in the register version table. Thus, in this example, the version number of the entry in the register version table for physical register 10 may be compared with "1", the version of the virtual identifier allocated to instruction I's destination register.

Assume that currently, the version number of the register version table entry for physical register 10 is version 3. Thus, there is not a match between the version of the virtual identifier allocated to instruction I's destination register, and the version of the entry for the corresponding physical register in the register version table. Accordingly, instruction I is not permitted to write a result in physical register 10, and may be replayed, possibly a number of times.

Now assume that some instruction retires and frees a virtual identifier corresponding to physical register 10, as described above. The version number for register 10 may be accordingly be incremented in the register version table to version 4. However, this still does not match the version number of the virtual identifier allocated to instruction I's destination register. Thus, instruction I must continue to be replayed, while whatever instruction was allocated the virtual identifier 4.10 is permitted to write to physical register 10.

Finally, assume that another instruction retires and frees another virtual identifier corresponding to physical register 10. The version number for register 10 may therefore be incremented (and thus cycle back) in the register version table to version 1. Now, there is a match between the version number of the virtual identifier allocated to instruction I's destination register and the version number of the entry for the corresponding physical register in the register version table, and therefore instruction I is permitted to write its result in physical register 10. Instruction I may then retire. Recalling that the previous mapping of instruction I's destination register to a virtual identifier had been read out of the register alias table, the associated available-version counter may be incremented. In this example, the virtual identifier previously mapped to logical register C was arbitrarily chosen to be 3.8 (see above). Accordingly, when instruction I retires, the available-version counter associated with physical register 8 may also be incremented to indicate that another version of that register is available for allocation. Further, the version number in the register version table for the virtual identifier corresponding to physical register 8 may be incremented.

Figure 3:
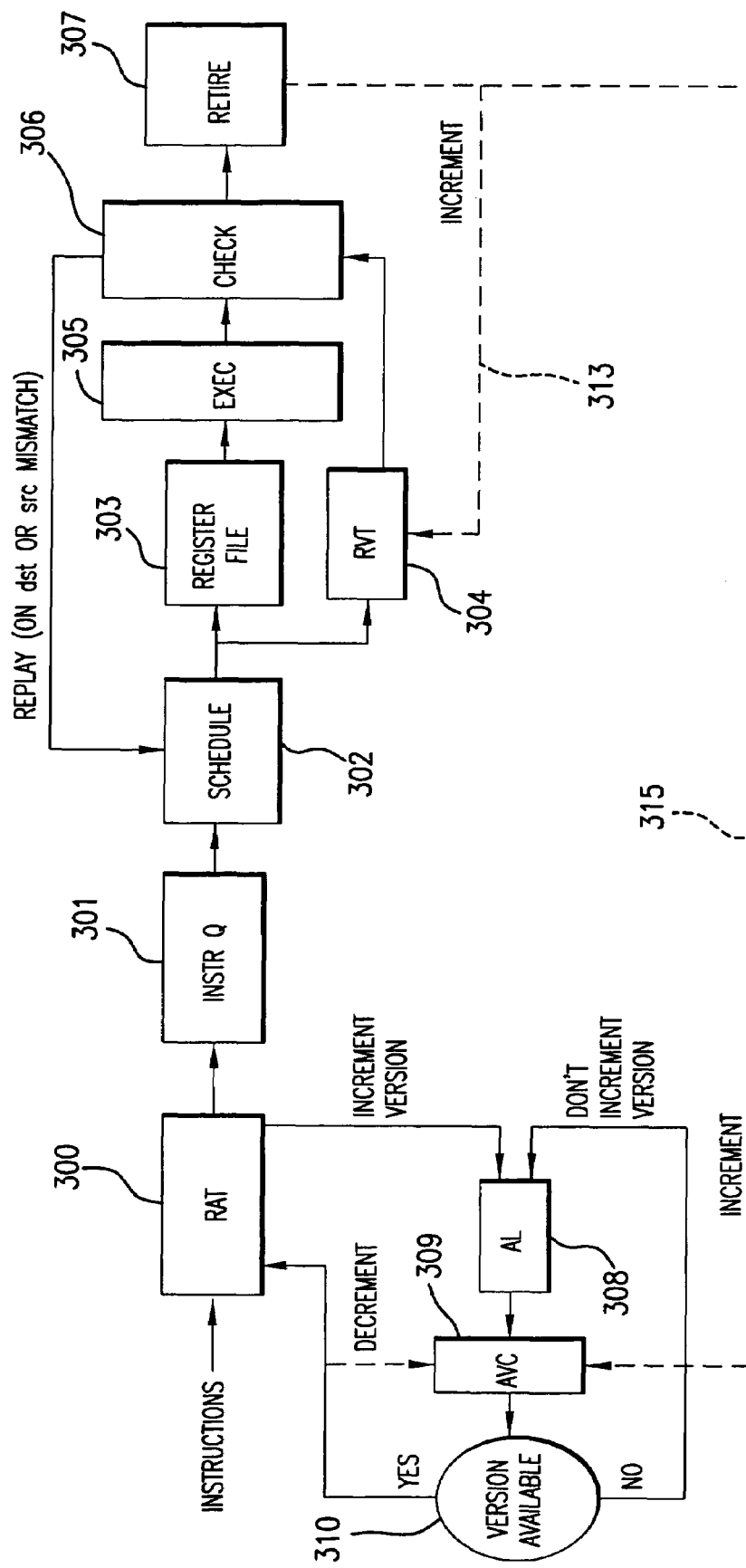
FIG. 3 shows elements of a system according to embodiments of the present invention.

FIG. 3 shows elements of a system according to embodiments of the invention. More specifically, FIG. 3 shows elements of a "back end" of a computer processor, where integrated circuit logic is shown as labeled rectangular blocks or an oval, connected by directed lines. Some elements shown in FIG. 3 are conventional; that is, typically a back end of a computer processor includes a register alias table 300, an instruction queue 301, schedule logic 302, a register file 303, execution logic 305, check logic 306, and retire logic 307. The register alias table 300 may perform mapping as described above and supply mappings to the instruction queue 301. The instruction queue 301 may be coupled to the schedule logic 302 and may hold instructions before they are inserted in the schedule logic 302; the schedule logic 302 may hold instructions until they are ready to execute, and then dispatch them for execution to the execution logic 305. The register file 303 may be coupled the execution logic 305 and the schedule logic 201, and supply instruction operands to the execution logic 305. The execution logic 306 may be coupled to the check logic 306 to check whether an instruction executed correctly or not. The check logic 306 may be coupled to the retire logic 307 to commit to the instruction's results if the instruction executed correctly, and to the schedule logic 302 to re-execute the instruction if the instruction did not execute correctly. Further, according to embodiments of the present invention, if the instruction was not able to write its result to a physical register because it was not authorized to do so by a register version table 304, an indication of this may be provided by the check logic 306 to the schedule logic 302 so that the instruction may be replayed.

According to embodiments of the invention, the system may further comprise a register version table 304 coupled to the check logic 306, to provide an indication to the check logic 306 when an instruction is not authorized to write to a physical destination register, and must accordingly be replayed. The schedule logic 302 may further be coupled to the register version table 304 to ensure that each instruction reads the correct version of its source. The register version table may be read to compare the version of the source virtual identifiers with the current versions in the register version table. If the versions do not match, the instruction may be replayed. The register version table 304 may further be coupled to the retire logic 307, to receive an "increment" indication 313 from the retire logic 307 that an instruction has retired and that therefore a corresponding entry in the register version table may be incremented.

Embodiments of the invention may further comprise an available-virtual-identifier list 308 coupled to available-version counters 309. The available-virtual-identifier list 308 and available-version counters 309 may operate as described above to provide a pool of virtual identifiers for mapping in the register alias table 300. The available-virtual-identifier list 308 and available-version-counters 309 may further be coupled to version-available decision logic 310 coupled to the register alias table 300 to provide an indication of an available virtual identifier to the register alias table 300. The version-available logic 310 may determine based on indications from the available-virtual-identifier list 308 and available-version counters 309 whether a virtual-identifier is available. If a virtual identifier is available and it is mapped in the register alias table 300, a "decrement" indication may be provided to the available-version counters 309. If a virtual identifier is not available, the version-available logic 310 may provide a "don't increment version" indication to the available-virtual-identifier list 308. The available-virtual-identifier list 308 may further receive an "increment version" indication from the register alias table 300 to indicate when a virtual identifier has been mapped. The available-version counters 309 may further receive an "increment" indication 315 from the retire logic 307 when an instruction retires and therefore a previously-mapped virtual identifier becomes available.

Figure 4:
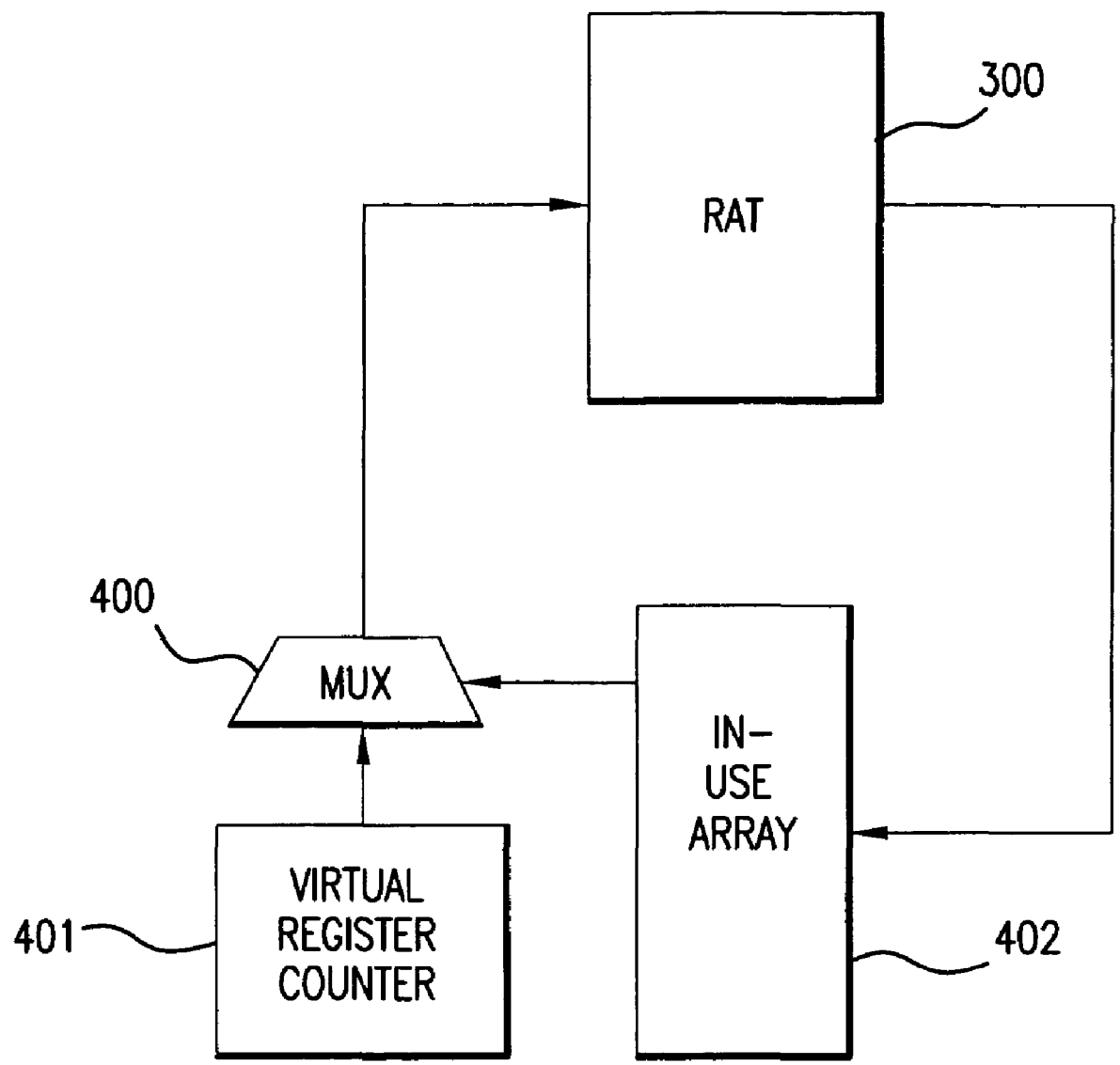
FIG. 4 shows an arrangement for supplying virtual registers according to embodiments of the present invention.

FIG. 4 illustrates an arrangement for supplying virtual registers that may be used as an alternative to the available-virtual-identifier list 308/available-version counters 309 configuration shown in FIG. 3. The alternative arrangement of FIG. 4 may comprise an in-use array 402 and a virtual register counter 401, both coupled to a multiplexer 400. The multiplexer 400 may be coupled to a register alias table 300 which is also coupled to the in-use array 402.

The virtual register counter 401 may be used to assign virtual identifiers to instructions. Fields of the virtual register counter 401 may comprise a version number and a physical register identifier as discussed above in connection with FIG. 1. For example, the virtual identifier counter 401 may be an 11-bit counter, with its 2 highest-order bits representing a version number, and its lower-order 9 bits representing 512 physical registers of a given processor. A value of the virtual register counter 401 at any given time may be provided as a virtual identifier to an instruction, and allocated as a writeback register to a destination register of an instruction along the lines discussed above.

The value of the virtual register counter 401 may be incremented each time a virtual identifier is allocated to an instruction. The virtual register counter 401 may, for example, start counting from 0 (zero), be incremented each time a virtual identifier is allocated, and when the maximum number representable by the counter is reached, re-cycle to zero and start over again. In the example mentioned earlier, 2048 different virtual identifiers could be represented the 11-bit counter.

The in-use array 402 may be used to ensure that a virtual identifier is not allocated if it is currently mapped in the register alias table 300. The in-use array 402 may comprise an entry corresponding to each physical register in a processor. Each entry may further comprise an "in-use" indicator, such as a bit, to indicate whether or not a corresponding physical register is currently mapped (via a virtual identifier) in the register alias table 300. An input from the register alias table 300 to the in-use array 402 may set the in-use indicator when the corresponding physical register (some version thereof, via a virtual identifier) is mapped in the register alias table 300.

An operation of the arrangement of FIG. 4 may be as follows. When the destination register of an instruction needs to be allocated a virtual identifier, a current value of the virtual register counter 401 may be applied to the multiplexer 400 along with an input from the in-use array 402. The inputs from the virtual register counter 401 may act to select a corresponding entry in the in-use array 402. If the selected entry does not have a corresponding virtual identifier already mapped in the register alias table 300, as indicated by its in-use indicator, the current value of the virtual register counter 401 may be allocated as a virtual identifier to the destination register, and mapped in the register alias table 300. On the other hand, if the selected entry does have a corresponding virtual identifier already mapped in the register alias table 300, the virtual register counter 401 may be incremented, thereby applying the foregoing test to another potential virtual identifier.

As noted, the arrangement of FIG. 4 ensures that no physical register currently mapped in the register alias table (via a corresponding virtual identifier) is allocated to an instruction. This maintains a balance of register supply and demand using an alternative mechanism to the available-virtual-identifier list/available-version counter arrangement described earlier.

Figure 5:
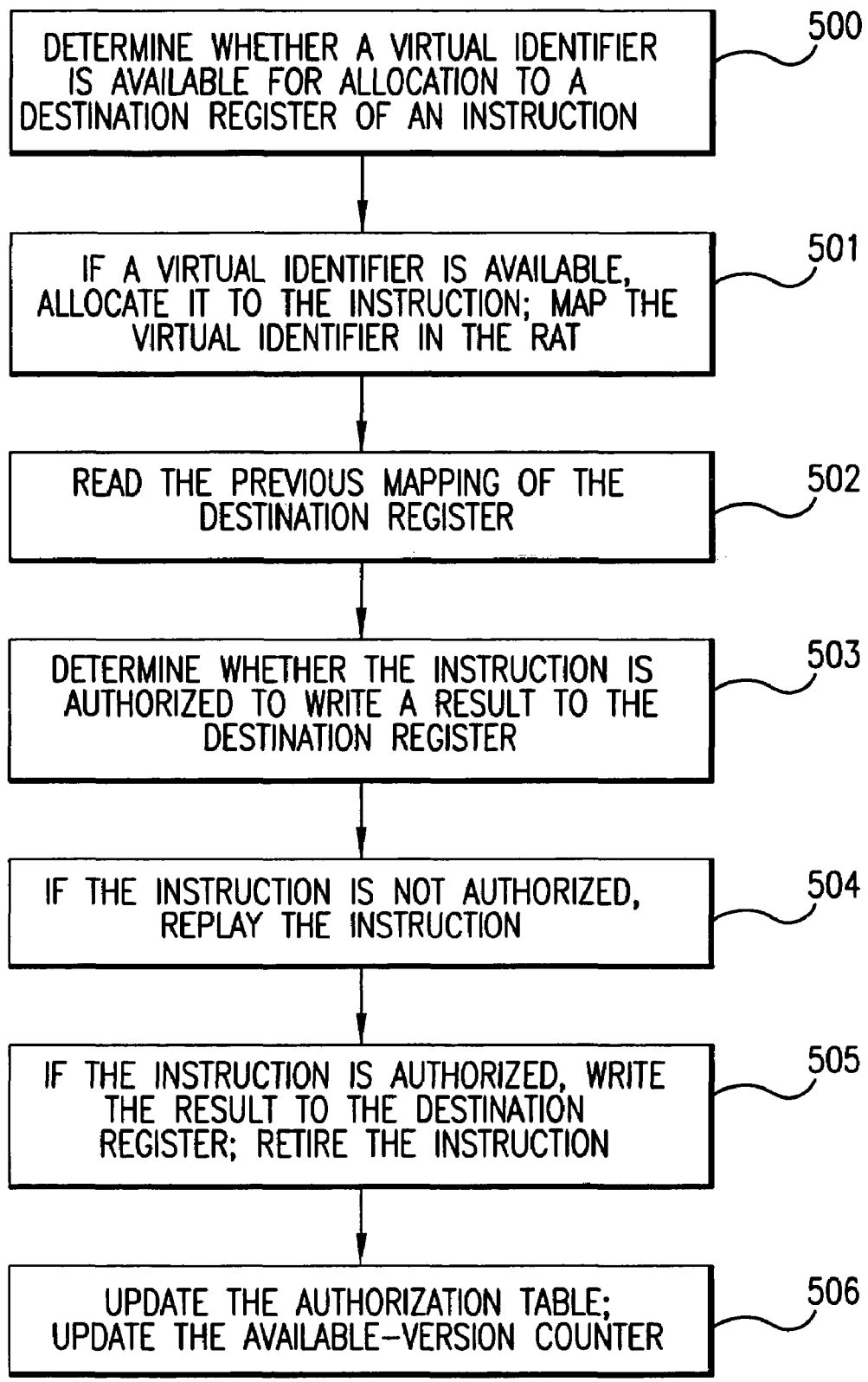
FIG. 5 shown a process flow according to embodiments of the present invention.

FIG. 5 shows a process flow according to embodiments of the invention. As shown in block 500, it may be determined whether a virtual identifier is available for allocation to an instruction to be executed. This may be done, according to embodiments of the invention, by reading an availability list, such as an available-virtual-identifier list and corresponding counters according to embodiments. If a virtual identifier is available, it may be allocated to the destination register of the instruction, and the virtual identifier may be mapped to the destination register in a register alias table, as shown in block 501. A previous mapping—that is, the virtual identifier to which the destination register had previously been allocated—of the destination register may be read from the register alias table, as shown in block 502.

The instruction may then be executed, and it may be determined by reading an authorization table, for example, a register version table according to embodiments of the invention, whether the instruction is authorized to write a result to its destination register, as shown in block 503. The determining may be done by comparing a version of the virtual identifier allocated to the destination register with a version of the virtual identifier in the authorization table. If the instruction is not authorized to write a result to its destination register, it may be replayed, as shown in block 504.

On the other hand, if the instruction is authorized by the authorization table to write its result to its destination register, it may do so and retire, as shown in block 505. As shown in block 506, when the instruction retires, the authorization table may be updated to indicate a new version of a virtual identifier authorized to be written to. More specifically, the authorization table may be updated with a new version of the virtual identifier to which the destination register had previously been allocated. Moreover, the available-version counter corresponding to the virtual identifier that was previously allocated to instruction's logical destination register may be incremented.

Figure 6:
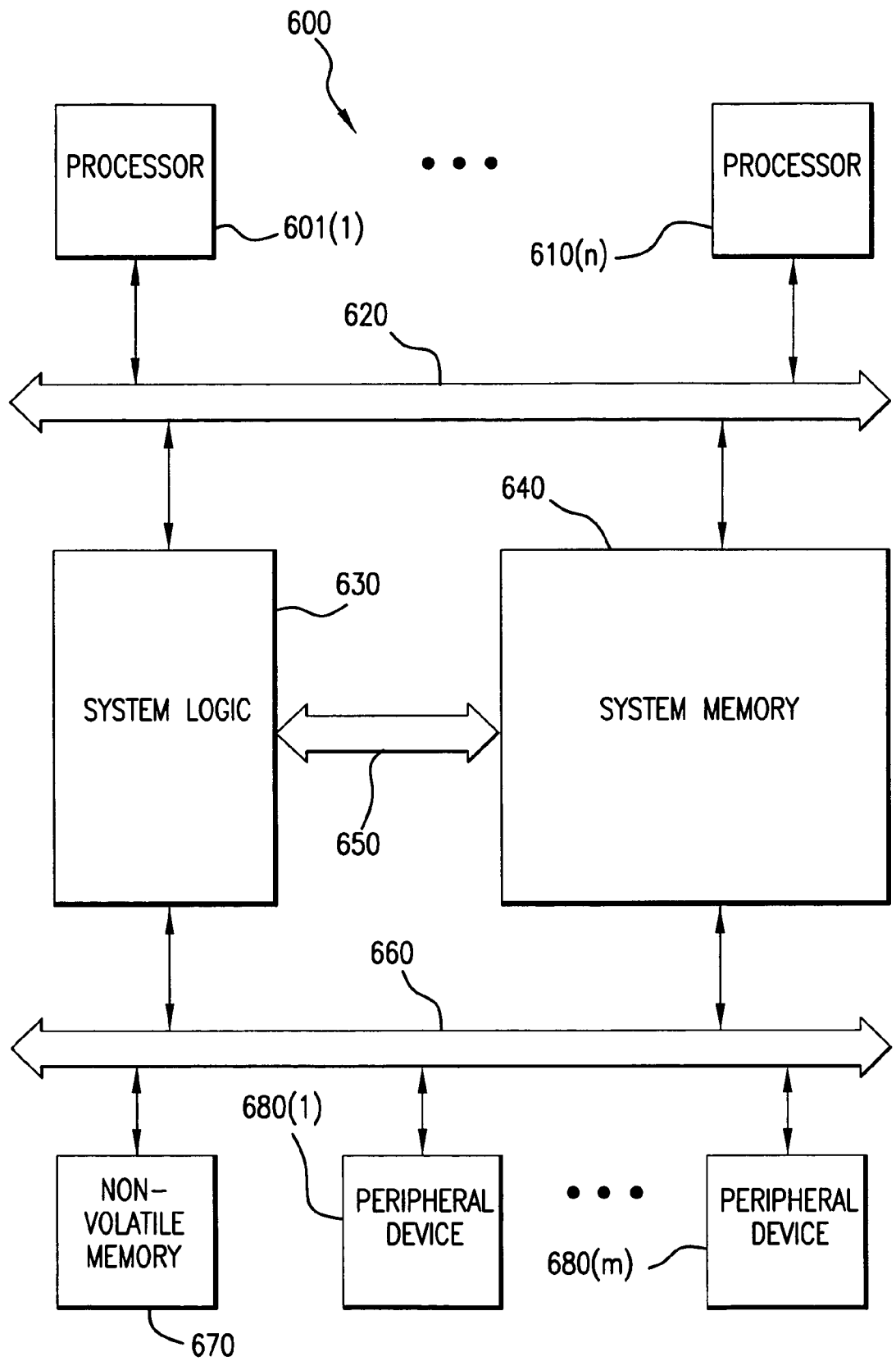
FIG. 6 is a block diagram of a computer system, which includes one or more processors and memory for use in accordance with an embodiment of the present invention.

FIG. 6 is a block diagram of a computer system, which may include an architectural state, including one or more processors and memory for use in accordance with an embodiment of the present invention. In FIG. 6, a computer system 600 may include one or more processors 610(1)-610(n) coupled to a processor bus 620, which may be coupled to a system logic 630. Each of the one or more processors 610(1)-610(n) may be N-bit processors and may include a decoder (not shown) and one or more N-bit registers (not shown). System logic 630 may be coupled to a system memory 640 through a bus 650 and coupled to a non-volatile memory 670 and one or more peripheral devices 680(1)-680(m) through a peripheral bus 660. Peripheral bus 660 may represent, for example, one or more Peripheral Component Interconnect (PCI) buses, PCI Special Interest Group (SIG) PCI Local Bus Specification, Revision 2.2., published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 670 may be a static memory device such as a read only memory (ROM) or a flash memory. Peripheral devices 680(1)-680(m) may include, for example, a keyboard; a mouse or other pointing devices; mass storage devices such as hard disk drives, compact disc (CD) drives, optical disks, and digital video disc (DVD) drives; displays and the like.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
   maintaining a plurality of virtual identifiers for each of a plurality of physical registers, each virtual identifier having an associated version number and each physical register associated with an available version counter;
   allocating one of said virtual identifiers to a destination register of an instruction in a processor pipeline; and
   after the instruction has executed and produced a result, determining whether the execution of the instruction may write the result to a physical register of the plurality of physical registers of a processor based on which version of a plurality of versions of virtual identifiers associated with the physical register is allocated to the destination register.

2. The method of claim 1, wherein the virtual identifier comprises a version number associated with a physical register identifier.

3. The method of claim 1, further comprising comparing a version of the virtual identifier allocated by the instruction to a version of the virtual identifier in an authorization table.

4. The method of claim 3, wherein the authorization table is cyclically updated with new versions of the virtual identifiers.

5. The method of claim 3, further comprising:
   if the version of the virtual identifier allocated by the instruction matches a version of the virtual identifier in the authorization table, permitting the instruction to write a result to the physical register.

6. A method comprising:
   assigning a plurality of virtual identifiers to respective ones of physical registers in a computer processor;
   maintaining an availability list indicating an availability of the virtual identifiers for allocation to instructions in a pipeline of the processor, each of said virtual identifiers having an associated version number and each physical register associated with an available version counter;

determining based on the list whether a virtual identifier is available for allocation to a destination register of an instruction;

if a virtual identifier is available, allocating it to the destination register; and determining, based on a version of the virtual identifier, whether the instruction is authorized to write a result to a corresponding physical register.

7. The method of claim 6, further comprising comparing the version of the virtual identifier allocated to the destination register to a version of the virtual identifier in an authorization table.

8. The method of claim 7, further comprising:

if the version of the virtual identifier allocated to the destination register and the version of the virtual identifier in the authorization table do not match, replaying the instruction.

9. The method of claim 7, further comprising:

if the version of the virtual identifier allocated to the destination register and the version of the virtual identifier in the authorization table match, writing the result to the corresponding physical register.

10. The method of claim 9, further comprising:

retiring the instruction; and updating the authorization table to indicate a new version of a virtual identifier authorized to be written to.

11. The method of claim 10, further comprising:

updating the list to indicate the availability of a new version of a virtual identifier for allocation.

12. A processor comprising:

a virtual identifier source device to supply virtual identifiers corresponding to physical registers in a processor for allocation to instructions in a pipeline of the processor, each of said virtual identifiers having an associated version number and each physical register associated with an available version counter; and an authorization device to determine which of the instructions are respectively allocated to one of a plurality of virtual identifiers supplied by the source device, each of the allocated virtual identifiers corresponding to a same physical register, is authorized to write to the physical register, based on which version of a plurality of versions of the virtual identifiers is allocated to a respective instruction.

13. The processor of claim 12, wherein the authorization device comprises a table of virtual identifiers having versions thereof that are cyclically updated.

14. The processor of claim 12, wherein the virtual identifier source device is coupled to a register alias table to map the virtual identifiers to physical registers.

15. The processor of claim 12, wherein the virtual identifier source device comprises a counter associated with an in-use array to determine a status of virtual identifiers mapped in a register alias table.

16. A system comprising:

a memory to hold instructions for execution; and a processor coupled to the memory to execute the instructions, the processor including:

a virtual identifier source device to supply virtual identifiers corresponding to physical registers in a processor for allocation to instructions in a pipeline of the processor, each of said virtual identifiers having an associated version number and each physical register associated with an available version counter; and an authorization device to determine which of the instructions are respectively allocated to one of the plurality of virtual identifiers supplied by the source device, each of the allocated virtual identifiers corresponding to a same physical register, is authorized to write to the physical register, based on which version of a plurality of versions of the virtual identifiers is allocated to a respective instruction.

17. The system of claim 16, wherein the authorization device comprises a table of virtual identifiers having versions thereof that are cyclically updated.

18. A processor comprising:

a plurality of physical registers each having a plurality of virtual identifiers associated therewith; and a register version table to store an entry corresponding to each physical register, the entry to include a version of a virtual identifier associated with the corresponding physical register, each of said virtual identifiers having an associated version number and each physical register associated with an available version counter, wherein a version number of the virtual identifier indicates whether an instruction having a destination logical register mapped to the virtual identifier is authorized to write a result to the corresponding physical register.

19. The processor of claim 18, further comprising an available-virtual-identifier list including an entry corresponding to each physical register, wherein each entry identifies the version number of a next available virtual identifier for a corresponding physical register.

* * * * *